United States Patent [19]
O'Brien, Jr. et al.

[11] Patent Number: 5,703,906
[45] Date of Patent: Dec. 30, 1997

[54] SYSTEM FOR ASSESSING STOCHASTIC PROPERTIES OF SIGNALS REPRESENTING THREE ITEMS OF MUTUALLY ORTHOGONAL MEASUREMENT INFORMATION

[75] Inventors: Francis J. O'Brien, Jr., Newport; Chung T. Nguyen, Bristol; Sherry E. Hammel, Little Compton, all of R.I.

[73] Assignee: The United States of America as represented by the Secretary of the Navy, Washington, D.C.

[21] Appl. No.: 605,292

[22] Filed: Jan. 17, 1996

[51] Int. Cl.$^6$ .................................................. H04L 27/06
[52] U.S. Cl. ................................. 375/316; 367/21
[58] Field of Search ............................ 375/346, 351, 375/326, 316, 224, 227; 455/218, 222, 223, 296, 63, 67.3; 367/21

[56] References Cited

U.S. PATENT DOCUMENTS

| | | | |
|---|---|---|---|
| 4,063,180 | 12/1977 | Norman | 375/351 |
| 5,161,185 | 11/1992 | Hochschild | 375/351 |
| 5,333,153 | 7/1994 | Brown et al. | 375/351 |

*Primary Examiner*—Temesghen Ghebretinsae
*Attorney, Agent, or Firm*—Michael J. McGowan; Michael F. Oglo; Prithvi C. Lall

[57] ABSTRACT

A signal processing system provides and processes a digital signal, generated in response to an analog signal, which includes a noise component and possibly also an information component representing three mutually orthogonal items of measurement information representable as a sample point in a symbolic Cartesian three-dimensional spatial reference system. A noise likelihood determination sub-system receives the digital signal and generates a random noise assessment of whether or not the digital signal comprises solely random noise, and if not, generates an assessment of degree-of-randomness. The noise likelihood determination system controls the operation of an information processing sub-system for extracting the information component in response to the random noise assessment or a combination of the random noise assessment and the degree-of-randomness assessment. The information processing system is illustrated as combat control equipment for submarine warfare, which utilizes a sonar signal produced by a towed linear transducer array, and whose mode operation employs three orthogonally related dimensions of data, namely: (i) clock time associated with the interval of time over which the sample point measurements are taken, (ii) conical angle representing bearing of a passive sonar contact derived from the signal produced by the towed array, and (iii) a frequency characteristic of the sonar signal.

6 Claims, 4 Drawing Sheets

SYSTEM FOR ASSESSING STOCHASTIC PROPERTIES OF SIGNALS REPRESENTING THREE ITEMS OF MUTUALLY ORTHOGONAL MEASUREMENT INFORMATION

STATEMENT OF GOVERNMENT INTEREST

The invention described herein may be manufactured by or for the Government of the United States of America for Governmental purposes without the payment of any royalties thereon or therefor.

CROSS-REFERENCE TO RELATED PATENT APPLICATIONS

The instant application is related to U.S. Pat. application entitled Ser. No. 08/412,260 SYSTEM AND METHOD FOR PROCESSING SIGNALS TO DETERMINE THEIR STOCHASTIC PROPERTIES (Navy Case No. 76119).

BACKGROUND OF THE INVENTION

(1) Field of the Invention

The invention relates generally to the field of systems and methods for performing digital signal processing operations in connection with signals and more particularly to systems and methods for characterizing signals to determine their stochastic properties, that is, to determine whether they are random. More particularly it relates to a system for performing this function of characterizing signals that represent information, which in turn is representable as a composite of three component items of mutually orthogonal measurement information. If the signals are random, they may be determined to constitute noise, in which case additional signal processing efforts which might be undertaken to process the signals to extract information therefrom can be avoided. Stated another way, the system and method allows a determination to be made of the extent to which a pattern of data items, or sample points representing three dimensions of measurement information conforms to a random structure of data.

(2) Description of the Prior Art

In a number of applications in which three mutually orthogonal items of measurement information undergo processing, it is desirable to be able to determine the likelihood that a signal is random. For example, an acoustic signal, received in an ocean environment, may constitute noise alone, or it may include some useful "information" along with a background noise. If the signal constitutes noise alone, its amplitude will be random, but if it includes information it will not be random and further processing may be useful to identify the information. In some prior art signal processing systems, it is assumed that three mutually orthogonal items of useful measurement information are present in the signal, and the signal is processed to try to extract this intelligence. It may be the case that the noise level of a received signal is so great that the information cannot be extracted and the processing effort will be wasted in any event. It is accordingly desirable to be able to determine the likelihood that a signal constitutes only noise, or if it also includes three mutually orthogonal items of measurement information so that a determination can be made as to whether processing of the signal to extract the information would be useful.

SUMMARY OF THE INVENTION

It is therefore an object of the invention to provide a new and improved signal processing system for processing signals which may contain useful information comprised of three mutually orthogonal items of measurement information to determine the stochastic (random) properties of the signals.

In brief summary, the signal processing system processes a digital signal, generated in response to an analog signal which includes a noise component and possibly also another component consisting of three mutually orthogonal items of measurement information. An information processing sub-system receives the digital signal and processes it to extract the information component. A noise likelihood determination sub-system receives the digital signal and generates a random noise assessment indicative of whether the digital signal comprises solely random noise, and also a degree-of-randomness assessment indicative of the degree to which the digital signal comprises solely random noise. The operation of the information processing sub-system is controlled in response one or both of these assessments. The information processing system is illustrated as combat control equipment for submarine warfare, which utilizes a sonar produced by a towed linear transducer array, and whose mode of operation employs three mutually orthogonal items of measurement information comprising: (i) clock time associated with the interval of time over which the sample point measurements are taken, (ii) conical angle representing bearing of a passive sonar contact derived from the signal produced by the towed array, and (iii) a frequency characteristic of the sonar signal.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DESCRIPTION OF THE PREFERRED EMBODIMENT

Figure 1:
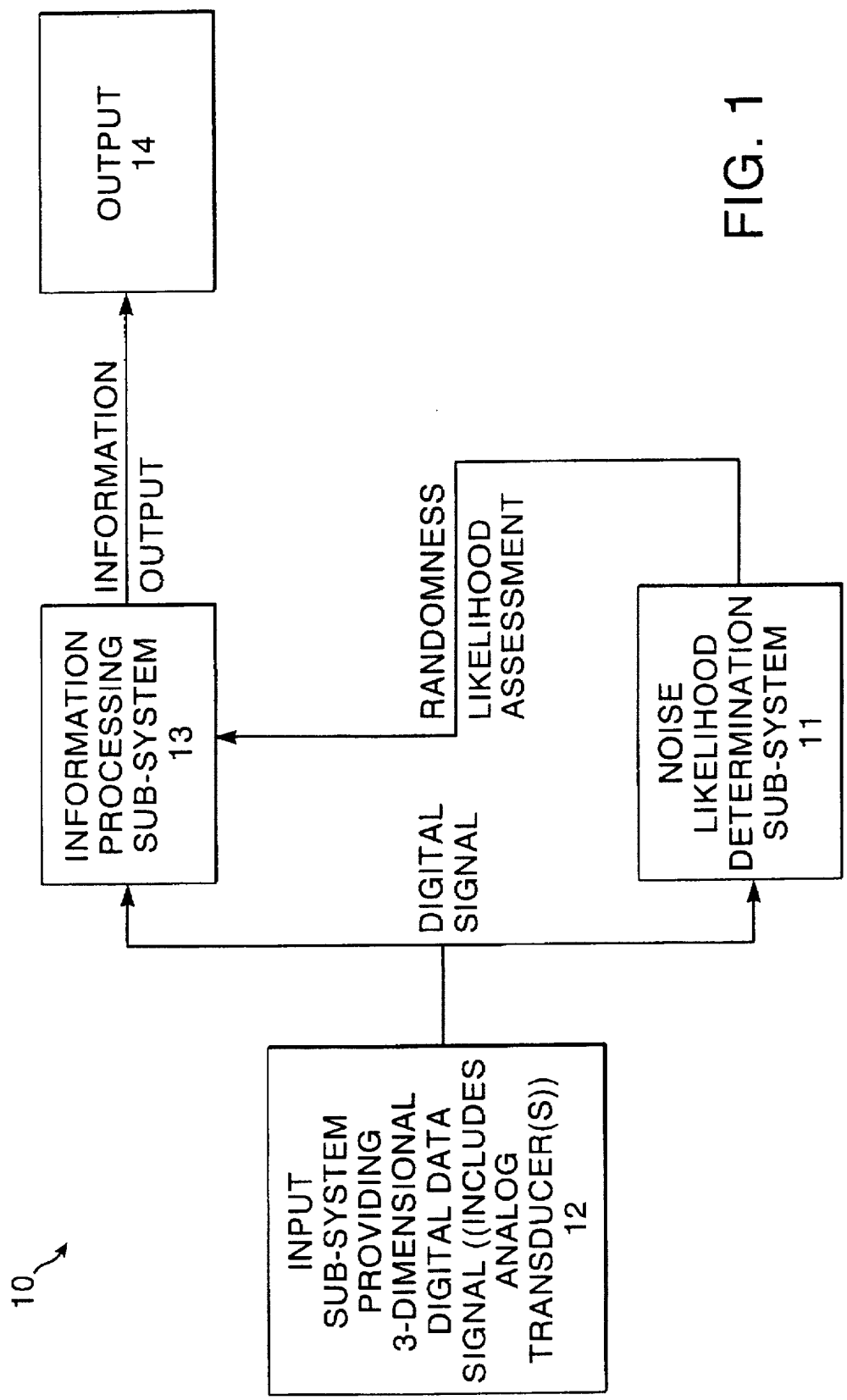
FIG. 1 is a functional block diagram of a an organization for processing a signal which may contain information comprised of three items of mutually orthogonal measurement information, constructed in accordance with the invention.

The invention provides a signal processing system 10 including a noise likelihood determination sub-system 11 constructed in accordance with the invention. FIG. 1 is a functional block diagram of the signal processing system 10. With reference to FIG. 1, the signal processing system 10 includes, in addition to the noise likelihood determination sub-system 11, an input sub-system 12, an information processing sub-system 13 and an output 14. Input sub-system 12 includes one or more analog transducers, and performs a front end processing function that provides a digital output signal which represents three mutually orthogonal items of measurement information. The transducer receives the signal, which is in acoustic, electrical, electromagnetic or other form and converts it to preferably digital form for processing. For example, sub-system 12 may be embodied as sonar array transducer equipment including a front end processing stage for feeding digital data to a sub-system 13 embodied as a combat control equipment for a naval submarine. The signal provided by sub-system 12 may be a multiplexed signal representing three-dimensions of measurement information related to a passive sonar acoustic signal which emanates from a sonar contact and which is received by one or more analog transducer arrays, including a linear transducer array towed behind the submarine. Such input subsystem 12 may process the received acoustic signal to provide a multiplexed digital output of items of data (sometimes hereinafter and in the appended claims referred to as "sample points" or simply "points") comprised of a signal components representative of (i) clock-times associated with the intervals of time during which the measurement samples are generated, (ii) signal power in a sector of conical angle representing bearing of the contact, and (iii) signal power in a sector or "frequency bin" of the spectral density distribution function of the acoustic signal. The information processing sub-system 13 performs conventional signal processing operations, such as adaptive and other filtering, to extract this information component from the digital signal. In accordance with the invention, the noise likelihood determination sub-system 11 determines the likelihood that the signal is solely noise, and also provides an assessment of the degree to which the incoming signal is composed of noise. This information will determine whether sub-system 13 will provide a useful result.

Figure 2A:
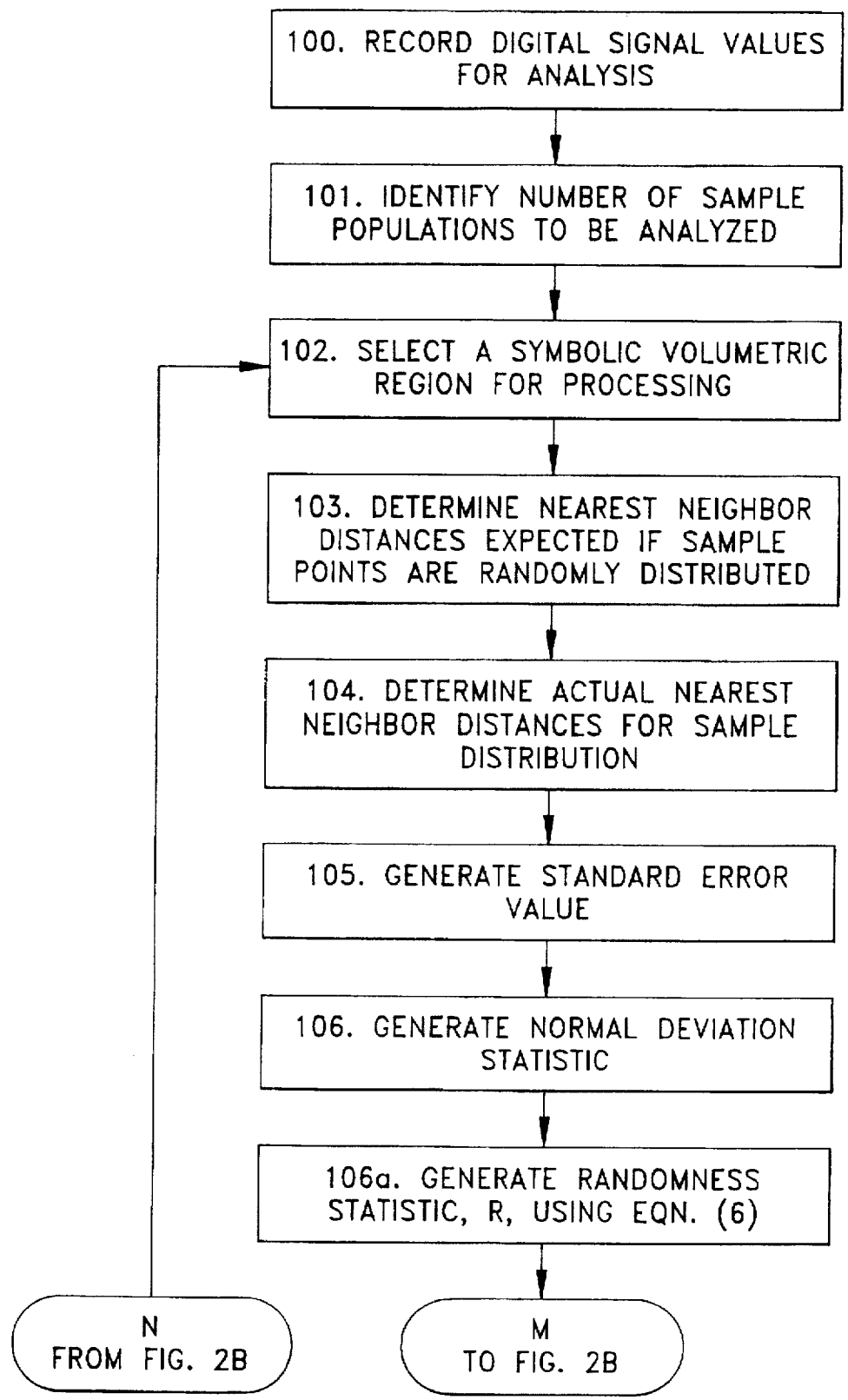
FIGS. 2A and 2B together comprise a flow chart depicting the operations of the system depicted in FIG. 1.
Figure 2B:
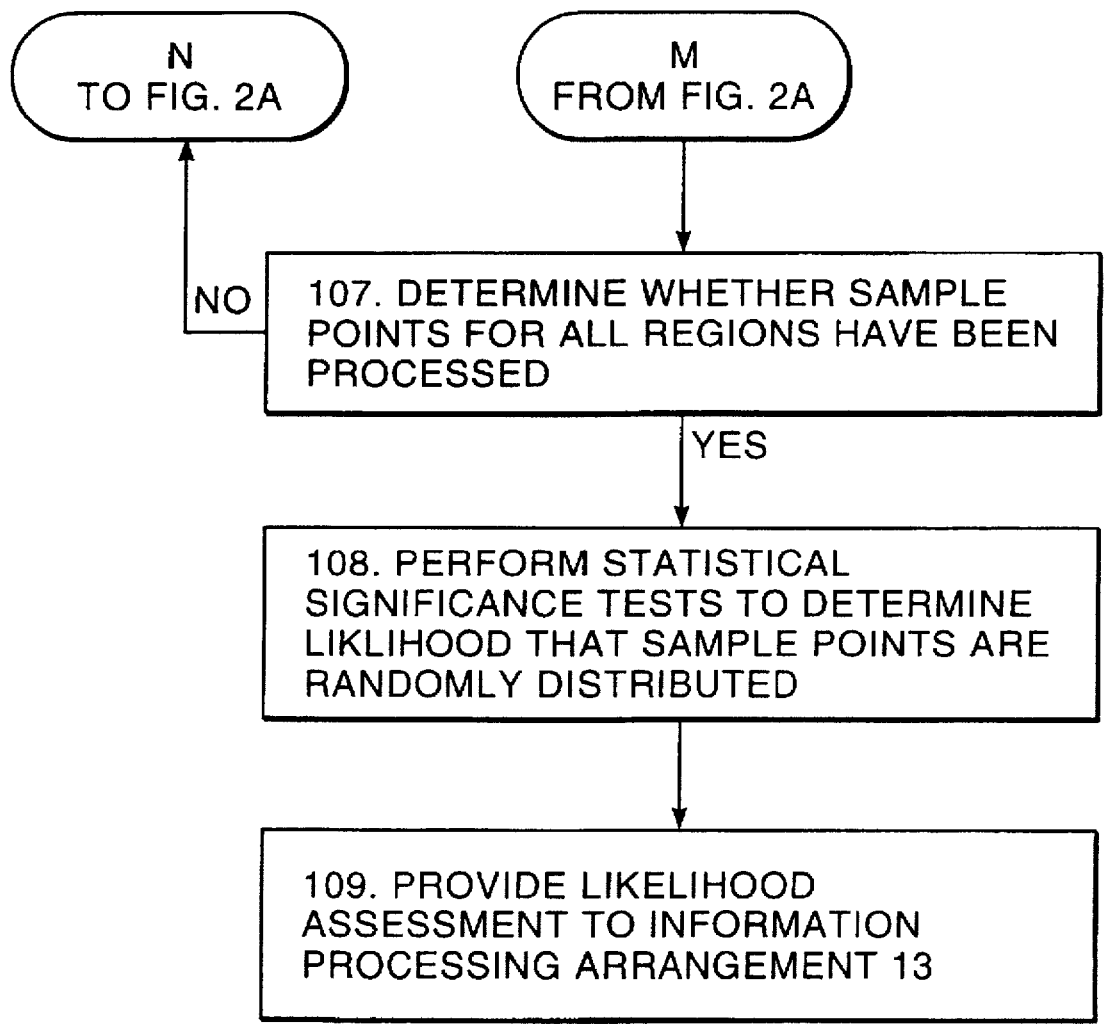
Figure 3:
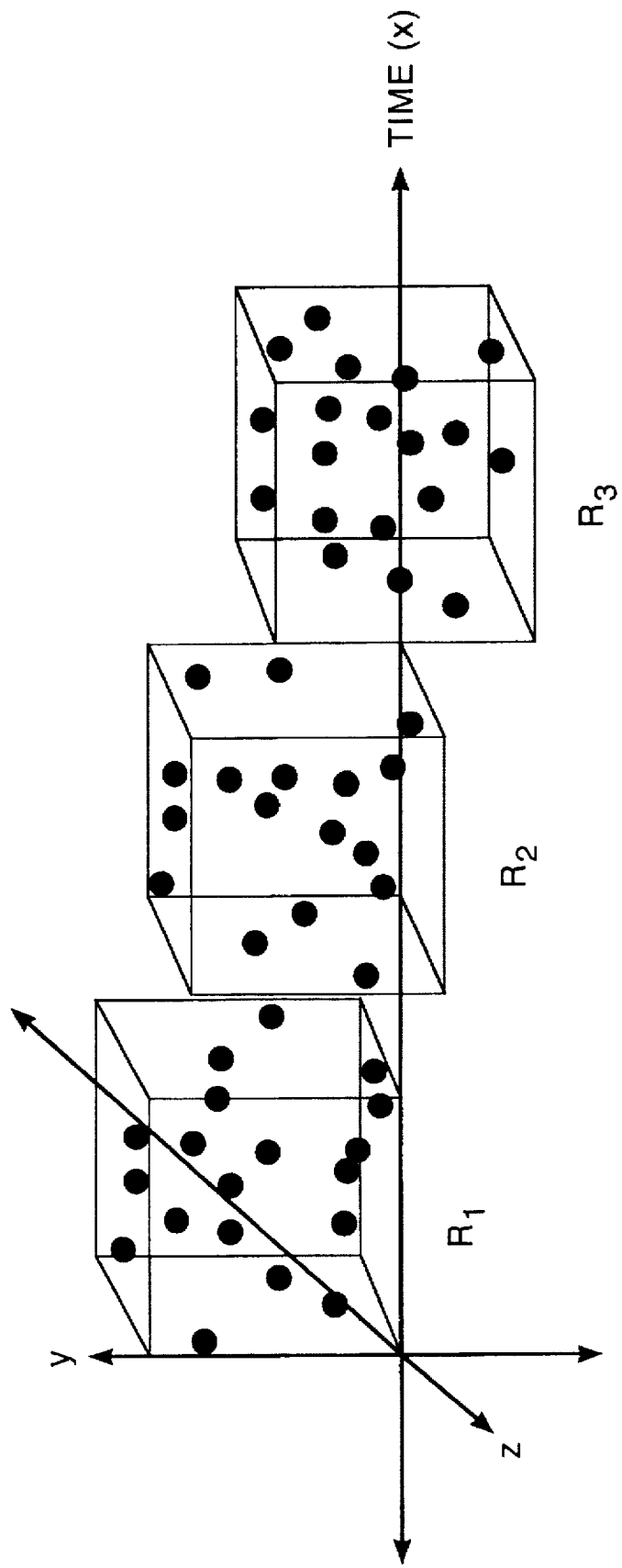
FIG. 3 is a perspective view diagrammatically representing a succession of non-overlapping, three-dimensional sample regions symbolic depicted as cubical volumes, each containing a population of sample point measurements.

The operations performed by the noise likelihood determination sub-system 11 will be described in connection with the flowcharts in FIG. 2A and 2b. Generally, the noise likelihood determination sub-system 11 performs several tests in connection with digital signal sample points. Each digital signal sample point, or simply "point", within each population comprises one of a series of composite digital signals, with each composite signal containing components representing three mutually orthogonal items of measurement information. For example, the sample point may be in the form of a multiplexed message containing three components, each representing one of the measurement information items. Each sample point is generated in a symbolic three-dimensional aperture defined, for example, by a selected repetitive interval of time. In turn, each signal sample point is one of a series of such points in a selected population of "N" points. In the aforesaid example in which sub-system 13 is embodied as submarine combat control equipment, the characteristic of mutual orthogonality of the three items of measurement information is an inherent characteristic rooted in the nature of the fire control or contact tracking problems being solved by sub-systems 12 and 13. The series of spatial apertures used in generating the various populations may be overlapping or non-overlapping. FIG. 3 is a perspective view in which the round, black dots diagrammatically represents a sequence of digital data points, each representing a signal sample point taken at successive intervals in time. The "x" axis (which in the perspective view of FIG. 3 is the horizontal axis) represents clock time and the location of a black dot relative thereto represents the time of occurrence of a spatial aperture. More particularly, it is a Cartesian representation of the instant of clock time of occurrence of some event (such as end time) of the interval of time which generates the spatial aperture. Clock time constitutes one of three mutually orthogonal items of measurement information diagrammatical depicted in FIG. 3. The "y" axis (vertical axis in the perspective view) provides a Cartesian representation of the relationship of a another of the three mutually orthogonal items of measurement information. The "z" axis (axis perpendicular to the plane of the "x" and "y" axis in the perspective view) provides a Cartesian representation of a third of the three mutually orthogonal items of measurement information. Successive populations of "N" signal sample points data are represented by successive cubical volumes (diagrammatically indicated in FIG. 3), or regions, of symbolic three-dimensional space.

With reference again to the flow chart of FIG. 2, the noise likelihood determination sub-system 11 will initially record the digital values represented by the various sample points, such as shown in FIG. 3, for analysis (step 100) and identify the number of populations of sample points to be analyzed (step 101).

The noise likelihood determination sub-system 11 then proceeds to a series of iterations, in each iteration selecting one sample point population and generating several metrics useful in determining the likelihood that the sample points in the population are randomly distributed in a three-dimensional spatial region containing the sample, that is, in the portion of the Cartesian space illustrated in FIG. 3 as a x-y-z symbolic cubical volume containing a population, or set, of "N" of sample points. It will be appreciated that the region (cubical volume in FIG. 3) containing each population of "N" sample points is bounded (step 102) along the time axis (that is, the "x"—or horizontal—axis shown in FIG. 3) by the beginning and end clock times for the region, and along each of the other two axes representing different ones of the mutually orthogonal items of measurement information (that is, the "y"—or vertical—axis; and the "z"—or perpendicular to "x-y" plane—axis, in FIG. 3) by minimum and maximum magnitudes of measurement values chosen to be inclusive of all sample points.

In each iteration, after selecting the sample point population to be analyzed during the iteration, the noise likelihood determination sub-system 11 then determines the average distance between nearest-neighbor sample points which would be expected if the sample points were randomly-distributed in the region of interest(step 103) and the distances between nearest-neighbor sample points (step 104). Each such distance is determined as the most direct linear span across the symbolic three-dimensional space between two sample points (with the linear span almost always ending up as having a three-dimensional skewed attitude). The noise likelihood determination sub-system 11 in step 103 generates the expected average distance between nearest-neighbor sample points as $$\mu_r = 0.5540 \, \rho^{-(\frac{1}{3})} \tag{1}$$

where "$\rho$" represents the spatial density of the sample points in the selected region, that is, N/V, where "N" represents the number of sample points in the selected population and "V" represents the volume of the corresponding selected three-dimensional spatial region.

The noise likelihood determination sub-system 11 in step 104 generates the actual distances between nearest-neighbor sample points as follows. Initially, the noise likelihood determination sub-system 11 establishes a distance matrix D including a number of rows and columns each associated with one of the sample points in symbolic three-dimensional space. The noise likelihood determination sub-system 11 then determines a distance value $d(i,j)$ representing the distance between each pair of sample points $(i,j)$. If the sample points are considered as points in a three-dimensional symbolic cubical volume (that is, with respect to a one if the above described x,y,z cubical volume set in FIG. 3) with the values of the coordinates given for each point the distance value representing the distance, i.e., the most direct linear span across the symbolic three-dimensional space between any two sample points "i" and "j" is $$d(i,j) = \sqrt{(x_i - x_j)^2 + (y_i - y_j)^2 + (z_i - z_j)^2} \tag{2}$$

where $(x_i, y_i, z_i)$, $(x_j, y_j, z_j)$ represent sampled signal data plotted as $(i,j,k)$ points. The noise likelihood determination sub-system 11 inserts each distance value $d(i,j)$ so generated in the appropriate location of a distance matrix D, and more particularly at row "i" and column "j" for each pair of sample points. Ignoring the values along the "matrix diagonal" d(i,j) of the distance matrix D (which, if generated by the noise likelihood determination sub-system 11 represent the distance between each point and itself), for each row "I," the matrix element d(I,j) ("j" being an index from "1" to the number "N" of sample points in the region) identifying the number having the lowest value is the minimum distance between the between the sample point associated with row I and any other sample point in the region. (Similarly, for each column "J," the matrix element d(i,J) ("i" also being an index from "1" to the number "N" of sample points in the region) identifying the number having the lowest value is the minimum distance between the sample point associated with column J and any other sample point in the region.) Representing the minimum value in each row "I" as "min $(d_{I,j})$," the actual average distance between nearest-neighbor sample points is $$\bar{r} = \frac{1}{N} [\min(d_{1,j}) + \min(d_{2,j}) + \ldots + \min(d_{N,j})] \quad (3)$$

where "N" corresponds to the number of sample points in the region.

Following step 104, the noise likelihood determination sub-system 11 generates a standard error value $\sigma_r$ of the nearest neighbor mean distance in a random population of density $\rho$ as $$\sigma_r = \frac{\sigma}{\sqrt{N}}, \quad (4)$$

where "$\sigma$" is the standard deviation of a theoretic model of random distribution (step 105).

The noise likelihood determination sub-system 11 uses the values for $\mu_r$ (the average distance between nearest-neighbor sample points that would be expected if the distribution were randomly distributed), $\bar{r}$ (the actual average distance between nearest-neighbor sample points), and the error value $\sigma r$ to generate a nearest neighbor assessment value, or simply a normal deviation statistic $$Z = \frac{\bar{r} - \mu_r}{\sigma_r} \quad (5)$$

(step 106) constitutes a first randomness identifier which will be used in performing a significance test as described below in connection with step 109.

Following step 106, the noise likelihood determination sub-system 11 performs a series of operations (step 106a) to generate a second randomness identifier namely the herebelow defined randomness statistic, R, which it uses in determining the likelihood that the digital signal represents a random distribution. In performing step 106a, subsystem 11 computes randomness statistic R in accordance with the relationship $$R = \frac{\bar{r}}{\mu_r}, \quad (6)$$

where the symbols in both the numerator and the denominator are as hereinabove defined. Values of R range from 0 (all points congest onto a single plane), through 1.0 (indicating pure randomness), to 2.0 (all points are from a uniform distribution of polyhedrons) in three-dimensional symbolic space. As an illustration of the interpretive utility of R, should its value be 0.50, it is deemed in connection with the operation of system 10 that this value represents a condition of the degree-of-randomness of a stream of incoming sample points which is generally 50% random. The usefulness of this degree-of-randomness output will be illustrated later herein in conjunction with an embodiment of information processing sub-system 13 comprising submarine combat control equipment of a type which employs Bayesian-based cost function and multiple hypothesis assessment techniques to enhance effectiveness of low signal-to-noise-ratio signals.

The noise likelihood determination sub-system 11 generates the values for Z (equation (5)), and R (equation (6)) for each of the plurality of populations. Accordingly, after it finishes generating the values (steps 106 and 106a) for one population, it returns to step 103 to perform the operations for the next population (step 107). After performing the operations to generate values for Z, and R for all of the populations, it sequences to a step 108 to perform a conventional significance test. In that operation (step 109) in connection with the value for Z, the noise likelihood determination sub-system 11 uses as the null hypothesis $$H_0: \bar{r} = \mu_r \quad (7)$$

as indicating that the points are randomly distributed, and uses the alternate hypothesis $$H_1: \bar{r} \neq \mu_r \quad (8)$$

as indicating that the points are not randomly distributed. It will be appreciated that, if the points are randomly distributed, the values for $\bar{r}$, the average actual distance between points in the population, would be distributed around $\mu_r$, the average distance between points that would be expected if the points were randomly distributed, in a Gaussian distribution with a mean, or average, of $\mu_r$. The standard significance test, using values for $\bar{r}$, $\mu_r$ and the normal deviate value Z, will indicate the likelihood that the null hypothesis is correct. The noise likelihood determination sub-system 11 may perform similar operations in connection with the values of R and the uniform dispersion plots generated for all of the populations, and will determine an assessment as to the likelihood that the signal as received by the transducer was totally random and if not determines a degree-of-randomness assessment. Sub-system 11 provides that assessment to the information processing sub-system 13 (step 109). The information processing sub-system 13 can use the randomness assessment in determining the utility of having an output from information processing system 13 appear at output 14, as will be presently illustrated.

An exemplary embodiment of information processing sub-system 13 comprises submarine combat control equipment which is responsive to passive sonar signals received (i) by a towed linear array trailing behind the submarine, and (ii) by a spherical transducer array at the submarine's bow. Measurement information representing clock times at the ends of the time intervals employed in generating sample points is internally available in the combat control equipment. Measurement information representing an actual relationship between the contact and the towed array (signal power in a conical angle sector representing conical bearing angle of a sonar contact relative to the axis of the towed array) is gathered by the towed array. Measurement information representing a frequency characteristic (signal power in a sector of the signal's spectral frequency distribution function) may be gathered by either the spherical array or the towed array or both. The combat control equipment is of a type which employs Bayesian-based statistical cost function techniques and multiple hypothesis assessment techniques to enable to equipment to generate analytical solutions of contact state estimations of the location of the contact. The principles of both Bayesian-based cost function techniques and multiple hypotheses assessment techniques are conventional and well known. Using these techniques, meaningful statistical state estimates of a contact's location can be determined from signals as noisy as having a 50% degree-of-randomness (R=0.5). The fact that the submarine's sonar signal gathering equipment provides three mutually orthogonal items of information measurements, namely (i) conical angle of the contact, (ii) a frequency characteristic of the sonar signal, and (iii) a clock time having a predetermined timed relationship to each time interval over which the signal is sampled, enables the combat system equipment to determine whether the processing performable by sub-system 13 should be available at output 14. For example, based upon a premise that sub-system can provide information yielding a meaningful state estimation of a contact's location with an input signal as noisy as having a degree of randomness R=0.5, but no higher, system 10 is provided with a suitable control to prevent appearance of any signal at output 14 if: (i) the signal from input subsystem 12 results in a "null hyperthesis" determination (equation (7)), i.e., the input signal is essentially solely random noise; or (ii) the signal results in an "alternate hypothesis (equation (8)) determination, but sub-system 11 further determines the degree-of-randomness, R, of the signal from input sub-system is a value greater than 0.5. The control can prevent appearance of a signal at output 14 by any suitable mode such as blocking coupling from input sub-system 12 to sub-system 13, disabling sub-system 13, or blocking coupling from the output of sub-system 13 to output 14.

Although the noise likelihood determination sub-system 11 has been described in connection with assessing randomness in connection with a signal, such as an acoustic, electrical or electromagnetic signal, it will be appreciated that the sub-system 11 will find utility in other areas in which it is desirable to assess randomness. Also, although described in relation to a Cartesian coordinate system, sub-system 11 will also find utility in embodiments that employ a polar coordinate system, or other coordinate systems.

The preceding description has been limited to a specific embodiment of this invention and the variations just discussed. It will be apparent, however, that even other variations and modifications may be made to the invention, with the attainment of some or all of the advantages of the invention. Therefore, it is the object of the appended claims to cover all such variations and modifications as come within the true spirit and scope of the invention.

What is claimed is:

1. A signal processing system comprising:
   means, including a transducer means, for receiving an analog signal which includes an information component and a noise component and for processing the analog signal to provide a digital signal comprising sample point measurements representing three mutually orthogonal items of measurement information, said sample point measurements being generated for a series of symbolic, three-dimensional spatial apertures relative to a symbolic three-dimensional spatial reference system;
   an information processing sub-system for receiving said digital signal and for processing it to extract said information component;
   a noise likelihood determination sub-system for receiving said digital signal and for generating a random noise assessment that the digital signal comprises random noise, the noise likelihood determination sub-system controlling the information processing sub-system in response to the random noise assessment, the random noise assessment being further generated in response to a nearest-neighbor distance deviation assessment generated in response to nearest-neighbor ones of the sample points in comparison with distances of the most direct linear spans across the symbolic three-dimensional reference space between a like number of nearest-neighbor reference points that are randomly distributed, the nearest-neighbor distance deviation further being generated for a plurality of selected sample point populations, each such selected population comprising a plurality of "N" sample point measurements, the random noise assessment further being generated in response to a standard significance test in connection with the nearest-neighbor distance deviation assessments generated for said populations;
   said noise likelihood determination sub-system further including reference point distance determination means for generating an expected average distance value $\mu_r$ between reference points within a corresponding selected symbolic three-dimensional reference spatial region containing a sample point population as $$\mu_r = 0.5540 \, \rho^{-(\frac{1}{3})}$$

where "$\rho$" represents the three-dimensional spatial density of reference points in the selected region;
   said noise likelihood determination sub-system still further including sample point distance determination means for generating an average nearest-neighbor sample point distance value as $$\bar{r} = \frac{1}{N}[\min(d_{1,j}) + \min(d_{2,j}) + \ldots + \min(d_{N,j})]$$

where "$\min(d_{i,j})$" corresponds to a minimum distance of such most direct lineal span across the symbolic three-dimensional reference space between sample points identified by indices "i" and "j" ; and
   said noise likelihood determination subsystem yet further including nearest-neighbor distance deviation assessment generating means for generating the nearest-neighbor distance deviation assessment value as $$Z = \frac{\bar{r} - \mu_r}{\sigma_r}$$

where $$\sigma_r = \frac{\sigma}{\sqrt{N}}.$$

2. A signal processing system as defined in claim 1 in which said noise likelihood determination sub-system includes randomness statistic generating means for generating a randomness statistic in response to an interpoint spacing parameter statistic, the noise likelihood determination sub-system generating the random noise assessment in response to the randomness statistic.

3. A signal processing system as defined in claim 2 in which the randomness statistic generating means includes means for generating a randomness statistic "R" in accordance with the relationship $$R = \frac{\bar{r}}{\mu_r}.$$

4. A signal processing system as defined in claim 1 wherein the received analog signal is an underwater acoustic signal and the mutually orthogonal items of measurement information of a sample point measurement comprise a clock time associated with the generation of a sample point measurement, an actual spatial relationship between the source of the acoustic signal and at least a portion of the transducer means, and a frequency characteristic of the acoustic signal.

5. A signal processing system as defined in claim 1 wherein said digital signal is in the form of a multiplexed message containing each mutually orthogonal item of information as a discrete component of the multiplexed message, each sample point measurement is generated over a predetermined interval of clock time, the clock time measurement information comprises the clock time at an instant in timed relationship to the interval of time generating the sample point measurement, the actual spatial relationship measurement information comprises signal power in a sector of conical angle representing bearing of the source of the acoustic signal relative to a linear axis associated with the transducer means, and the frequency characteristic measurement information comprises signal power in a sector of the spectral density distribution function of the acoustic signal.

6. A signal processing system as defined in claim 1 wherein said symbolic spatial reference system is a Cartesian coordinate system.

* * * * *